(12) United States Patent
Lecellier et al.

(10) Patent No.: US 9,129,345 B2
(45) Date of Patent: Sep. 8, 2015

(54) DATA STREAM PROCESSING ARCHITECTURE ENABLING EXTENSION OF NEIGHBORHOOD MASK

(75) Inventors: Maria Lecellier, Bourg la Reine (FR); Stéphane Guyetant, Le Plessis Robinson (FR); Renaud Schmit, Auneau (FR)

(73) Assignee: Commissariat A L'Engergie Atomique et aux Energies Alternatives, Paris (FR)

( * ) Notice: Subject to any disclaimer, the term of this patent is extended or adjusted under 35 U.S.C. 154(b) by 328 days.

(21) Appl. No.: 13/637,366

(22) PCT Filed: Mar. 17, 2011

(86) PCT No.: PCT/EP2011/054086
§ 371 (c)(1),
(2), (4) Date: Feb. 11, 2013

(87) PCT Pub. No.: WO2011/117144
PCT Pub. Date: Sep. 29, 2011

(65) Prior Publication Data
US 2013/0155082 A1 Jun. 20, 2013

(30) Foreign Application Priority Data
Mar. 26, 2010 (FR) .................................. 10 52207

(51) Int. Cl.
*G06F 15/16* (2006.01)
*G06F 13/00* (2006.01)
(Continued)

(52) U.S. Cl.
CPC .... *G06T 1/00* (2013.01); *G06T 1/20* (2013.01)

(58) Field of Classification Search
CPC .......... G09G 5/363; G06T 5/20; G06T 11/60; G06F 9/52; G06F 9/3885

USPC .......... 345/502; 382/205, 276, 308; 711/152; 712/22
See application file for complete search history.

(56) References Cited

U.S. PATENT DOCUMENTS

2002/0040437 A1* 4/2002 Yamauchi et al. ............. 713/193
2005/0147313 A1* 7/2005 Gorinevsky .................. 382/255
(Continued)

OTHER PUBLICATIONS

Title: A 125 GOPS 583 mW Network-on-Chip Based Parallel Processor with Bio-Inspired Visual Attention Engine Author: Kwanho Kim Date: Jan. 2009.*

(Continued)

*Primary Examiner* — Kee M Tung
*Assistant Examiner* — Yi Yang
(74) *Attorney, Agent, or Firm* — Baker & Hostetler LLP

(57) ABSTRACT

An architecture for processing a data stream forming matrices of pixels of dimension Nl×Nc. The processing architecture includes processing units and interconnection means making it possible to transfer the data stream between them. Each processing unit includes a control unit, neighborhood processors capable of carrying out the instructions from the control unit and a neighborhood storage unit enabling each neighborhood processor to access a neighborhood of dimension Vl×Vc. The invention makes it possible to extend the dimension of the neighborhoods accessible to the neighborhood processors by a coupling of two or more processing units. To this end, the architecture includes a storage manager enabling the neighborhood processors of the coupled processing units to access adjoining neighborhoods of pixels, and means for communication between neighborhood processors allowing for an exchange of data relating to the different neighborhoods.

11 Claims, 6 Drawing Sheets

(51) Int. Cl.
　　　*G06F 13/28*　　　(2006.01)
　　　*G06T 1/00*　　　(2006.01)
　　　*G06T 1/20*　　　(2006.01)

(56) References Cited

U.S. PATENT DOCUMENTS

2005/0182915 A1* 8/2005 Devaney et al. ................. 712/10
2007/0182750 A1* 8/2007 Teruyama et al. ............ 345/558
2009/0122629 A1* 5/2009 Warner ......................... 365/203
2010/0060651 A1* 3/2010 Gala ............................. 345/506

OTHER PUBLICATIONS

Kwanho Kim, et al, "A 125GOPS 583mW Network-on-Chip Based Parallel Processor with Bio-inspired Visual-Attention Engine", 2008 IEEE International Solid-State Circuits, 2008, pp. 308, 309, and 615, vol. 44, No. 1, IEEE.

* cited by examiner

DATA STREAM PROCESSING ARCHITECTURE ENABLING EXTENSION OF NEIGHBORHOOD MASK

CROSS-REFERENCE TO RELATED APPLICATIONS

This application is a National Stage of International patent application PCT/EP2011/054086, filed on Mar. 17, 2011, which claims priority to foreign French patent application No. FR 10 52207, filed on Mar. 26, 2010, the disclosures of each of which are incorporated by reference in their entireties.

FIELD OF THE DISCLOSED SUBJECT MATTER

The invention falls within the field of the processing architectures working in data stream mode on neighborhoods of pixels, having a strong flexibility requirement and being greatly constrained in terms of silicon surface area and energy consumption. It applies mainly to the processing of embedded images as in mobile telephony, personal multimedia devices or digital cameras and camcorders. Other fields may be related, such as autonomous robotics, sensor arrays or vehicle driving assistance. More specifically, the invention relates to a data stream processing architecture forming matrices of pixels of Nl rows by Nc columns, the architecture comprising processing units and interconnection means for transferring the data stream between the processing units.

BACKGROUND

In the field of image processing, neighborhood masks are commonly employed when it is necessary to consider the environment of a pixel to be processed. A neighborhood mask is defined as a selection area in the image. With the changes in image processing, the neighborhood masks are becoming increasingly extensive. At the same time, the research and development and manufacturing costs of architectures supporting image processing place major constraints on their development in terms of silicon surface area and electricity consumption, notably when these architectures are designed for embedded applications intended for the general public. The issue in this field is therefore to have open-ended and flexible computation architectures which, given the same circuit, are capable of supporting the existing processing operations as well as those to come whose computational complexity will be greater. One of the known solutions for meeting these needs consists in using modular architectures, based on stream processing units each comprising a set of neighborhood processors operating in parallel on neighboring data. A first exemplary architecture is described in the patent application EP 08 05369. Each processing unit comprises a set of processors and a storage unit containing all the neighborhoods accessible to the processors. However, a processor can access only the neighborhood which is assigned to it. Furthermore, the dimension of the storage unit is fixed. Consequently, the size of the neighborhoods accessible to the processors is limited to that provided at the time of the design of the circuit. A second exemplary architecture is proposed by the Korea Advanced Institute of Science and Technology and described in K. Kim et al., "A 125 GOPS 583 mW Network-on-Chip based parallel processor with bio-inspired visual attention engine", IEEE Journal of Solid-State Circuits, vol. 44, no. 1, January 2009. Each processing unit comprises a set of processors and a local memory. Each processor has full access to the local memory of the processing unit to which it belongs. The local memories of different processing units can communicate with one another and each processor can communicate with left and right neighboring processors, including if a neighboring processor is located in another processing unit. These communications between local memories and between processors make it possible to extend the size of the neighborhoods accessible to the processors. The architecture is, however, ill suited to such a use: on the one hand, the communication from processor to left/right neighboring processor between processing units allows only one datum to be exchanged per cycle, which in practice limits the extension of the size of the neighborhoods. Also, the communication from local memory to local memory entails overwriting at least a portion of the data present in one of the local memories, which constrains the order in which the data must be processed.

SUMMARY

One aim of the invention is to propose a data stream processing architecture of the type of that described in the patent application EP 08 05369, which makes it possible to perform processing operations on neighborhoods of pixels of dimension greater than that which a single processor is capable of processing. This aim is achieved by the introduction of a storage manager capable of formatting the data of the stream in the storage units of the different processing units so that a neighborhood can be distributed in the storage units of several processing units, and by the addition of connection means between neighboring processors of one and the same processing unit or of different processing units, so that a processor can communicate with the processor or processors having access to pixels of the neighborhood concerned. More specifically, the subject of the invention is a data stream processing architecture, the data forming matrices of pixels of dimension Nl×Nc, the architecture comprising:

processing units, each processing unit being capable of receiving an input data stream and of delivering an output data stream, and interconnection means capable of receiving a data stream at the input of the architecture and the data streams at the output of the processing units, and capable of delivering a data stream at the output of the architecture, each processing unit comprising:

a control unit (UC) capable of supplying instructions, a set of neighborhood processors capable of performing the instructions received from the control unit and of supplying data forming the data stream at the output of the processing unit, and a neighborhood storage unit enabling each neighborhood processor to access data of the stream received by the processing unit forming a neighborhood of pixels of dimension Vl×Vc, the neighborhoods accessible to the processors being centered on contiguous pixels of one and the same row of a matrix, two processors being neighbors when the neighborhoods that they can access are centered on contiguous pixels in one and the same row of a matrix, characterized in that two processing units can be coupled on a North/South axis and each comprise:

one and the same number N of neighborhood processors, intra-unit connection means enabling each neighborhood processor to exchange data with each of its neighboring processors, so that the neighborhood of pixels accessible to a neighborhood processor can be extended to all the neighborhoods of pixels accessible to the neighborhood processors of the coupled processing unit concerned, said set forming a neighborhood of pixels of dimension Vl×(Vc+N−1), the architecture also comprising:

a storage manager capable of receiving a data stream from the interconnection means and enabling the neighborhood processors of a first coupled processing unit to access neighborhoods of pixels contiguous with the neighborhoods of pixels accessible to the neighborhood processors of a second coupled processing unit, so that the neighborhoods of pixels accessible to the neighborhood processors of the two coupled processing units can form a vicinity of dimension $2 \cdot Vl \times (Vc+N-1)$, and connection means on the North/South axis enabling each neighborhood processor of the first coupled processing unit to exchange data with one of the neighborhood processors of the second coupled processing unit, the neighborhood processors being linked in pairs so as to have access to neighborhoods of pixels centered on one and the same column of a matrix, so that the neighborhood of pixels accessible to each neighborhood processor can be extended to the neighborhoods of pixels accessible to the neighborhood processor to which it is linked.

The invention notably has the advantage that the increase in the size of the accessible neighborhood mask is accompanied by an increase in the computation capacity over this neighborhood.

According to a particular embodiment, the storage manager comprises:

a reserve memory for each coupled processing unit on the North/South axis, each reserve memory being capable of storing data from the stream received by the processing unit considered being able to form a global neighborhood of pixels of dimension $Vl \times Nc$, the neighborhood storage unit of each coupled processing unit enabling each of its neighborhood processors to access data in the reserve memory associated with the coupled processing unit considered, and connection means between the reserve memories, so that the reserve memories associated with two coupled processing units can store data that can form a coupled neighborhood of pixels of maximum dimension $2 \cdot Vl \times Nc$.

The reserve memories can each comprise Vl memory rows, each memory row being capable of storing data from a row of a matrix, the memory rows being linked in series, so that a data stream stored on a first memory row can be transmitted successively to the other memory rows.

The connection means between two reserve memories can comprise a multiplexer with Vl inputs and one output, each input being able to be linked to one of the memory rows of a first reserve memory, the output being able to be linked to an input of the second reserve memory.

According to a particular embodiment, two processing units can be coupled on an East/West axis, the architecture also comprising connection means on the East/West axis enabling a neighborhood processor of a first processing unit coupled on the East/West axis to exchange data with a neighboring neighborhood processor of a second processing unit coupled on the East/West axis to the first processing unit, so that the neighborhood of pixels accessible to each of said neighborhood processors is formed by the joining of the neighborhoods of pixels accessible to each of the two neighborhood processors.

The storage manager can then comprise:

a reserve memory for each processing unit coupled on the East/West axis, each reserve memory being capable of storing data from the stream received by the processing unit considered being able to form a global neighborhood of pixels of dimension $Vl \times Nc$, the neighborhood storage unit of each coupled processing unit enabling each of its neighborhood processors to access data from the reserve memory associated with the coupled processing unit considered, and connection means between the reserve memories, so that the reserve memories associated with two processing units coupled on the East/West axis can store data that can form a coupled neighborhood of pixels of maximum dimension $Vl \times 2 \cdot Nc$.

The architecture may also comprise means for synchronizing the coupled processing units to check that the data that have to be recovered by the neighborhood processors of the first processing unit have been made available by the neighborhood processors of a second processing unit coupled with the first processing unit.

The synchronization means of the coupled processing units may comprise a flag for each coupling between two processing units, each flag being able to indicate either that the data that have to be recovered by the neighborhood processors of a first processing unit have been made available by the neighborhood processors of a second processing unit coupled with the first processing unit, or that said data are not available.

Each neighborhood storage unit may comprise a memory making it possible to store the data forming the neighborhoods of pixels which the neighborhood processors can access.

According to a particular embodiment, the connection means on the North/South axis comprise, for each neighborhood processor of a processing unit coupled on the North/South axis, a data register accessible to the neighborhood processor to which it is linked.

Still according to a particular embodiment, the intra-unit connection means and, where appropriate, the connection means on the East/West axis, comprise, for each neighborhood processor, a first data register accessible to one of its neighboring neighborhood processors, and a second data register accessible to its other neighboring neighborhood processor.

The architecture may comprise $K \cdot M$ processing units organized in a matrix of K processing units coupled in pairs on the North/South axis and M processing units coupled in pairs on the East/West axis, the storage manager being configured so that the reserve memories can store data that can form a coupled neighborhood of dimension $K \cdot Vl \times M \cdot Nc$, and the connection means being configured so that the neighborhood of pixels accessible to each neighborhood processor of a coupled processing unit can be extended to the neighborhoods of pixels accessible to the neighborhood processors of the coupled processing units.

BRIEF DESCRIPTION OF THE DRAWINGS

The invention will be better understood and other advantages will become apparent on reading the following description, given in light of the appended drawings in which.

DETAILED DESCRIPTION

The following description relates to video data stream processing architectures forming images of dimension Nl×Nc, that is to say Nl rows by Nc columns of pixels. These architectures notably make it possible to perform so-called low-level image processing operations, such as the detection of outlines or morphological operations (erosion, expansion, Manhattan distance), and so-called high-level image processing operations, such as object detection. These processing operations often require the entire neighborhood of the pixel being processed to be considered. To this end, neighborhood masks are used. A neighborhood mask is defined as a selection area of dimension Vl×Vc, that is to say Vl rows by Vc columns of pixels. The invention nevertheless applies to the processing of any data stream, provided that the data can be arranged coherently in the form of two-dimensional matrices.

Figure 1:
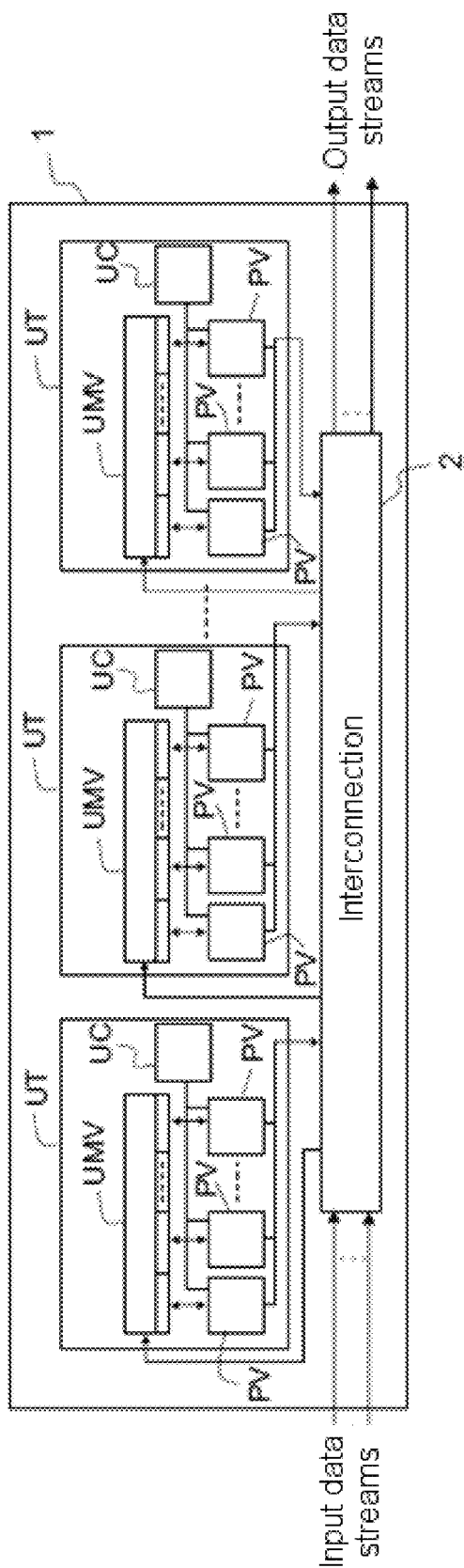
FIG. 1 is a block diagram of a data stream processing architecture on which the invention is based.

FIG. 1 is a block diagram of a data stream processing architecture on which the invention is based. The architecture 1 comprises processing units UT and interconnection means 2 enabling data streams to be transferred within the architecture 1. In the case in point, the interconnection means 2 receive one or more input data streams, corresponding to the data streams received by the architecture 1, and deliver one or more output data streams, corresponding to the data streams delivered by the architecture 1. The interconnection means 2 also make it possible to transfer data streams between the processing units UT. Each processing unit UT comprises neighborhood processors PV, a control unit UC and a neighborhood storage unit UMV. The neighborhood processors PV receive instructions from the control unit UC. They operate in parallel in SIMD mode (SIMD being an acronym for "single instruction multiple data"). In other words, the processors perform, at a given instant, the same instruction on different data. The neighborhood storage unit UMV acts as a buffer memory for the neighborhood processors PV. It receives a data stream from the interconnection means 2 and stores the data in the form of neighborhoods of pixels. These neighborhoods of pixels correspond to the different neighborhood masks used by the processing unit UT concerned. They are, for example, square neighborhoods of dimension V×V. The number V is typically an odd number, so that the central pixel of the neighborhood, called processed pixel, is framed by the same number of pixels on each of its sides. Each neighborhood processor PV can access one of these neighborhoods. As a general rule, the neighborhood storage unit UMV and the neighborhood processors PV are configured so that the neighborhood processors PV access neighborhoods of pixels centered on contiguous pixels of one and the same row of the image. The neighborhood processors PV are linked at the output to the interconnection means 2. They make it possible to deliver a data stream which can be either processed by another processing unit UT, or delivered as output from the architecture 1. When the processing architecture 1 receives several input data streams, separate processing units are assigned to each data stream to allow for the parallel processing of the different data streams. In the architecture 1 of FIG. 1, each neighborhood processor PV can, at a given instant, access only the pixels stored at that instant in the neighborhood which is assigned to it in the neighborhood storage unit UMV. Consequently, each neighborhood processor PV can perform instructions only on a limited neighborhood of pixels. The maximum dimension of the neighborhood accessible to a neighborhood processor PV is determined by the neighborhood storage unit UMV, notably by its storage capacity.

The invention makes it possible to extend the dimension of the neighborhood masks, that is to say of the neighborhoods accessible to a neighborhood processor, by a coupling of two or more processing units. It relies essentially on the insertion of two elements into the architecture of FIG. 1, namely a storage manager and means for communication between neighboring neighborhood processors. The storage manager must enable the neighborhood processors of the coupled processing units to access adjoining neighborhoods of pixels. The communication means between neighboring processors must allow for both a sharing of the computational resources and an exchange of data relating to the processing operations performed on the different neighborhoods of pixels. In other words, the storage manager has to allow for an assembly of neighborhoods and the communication means between processors have to allow for a global processing of this assembly of neighborhoods by pooling the local processing operations performed on the different neighborhoods.

Figure 2:
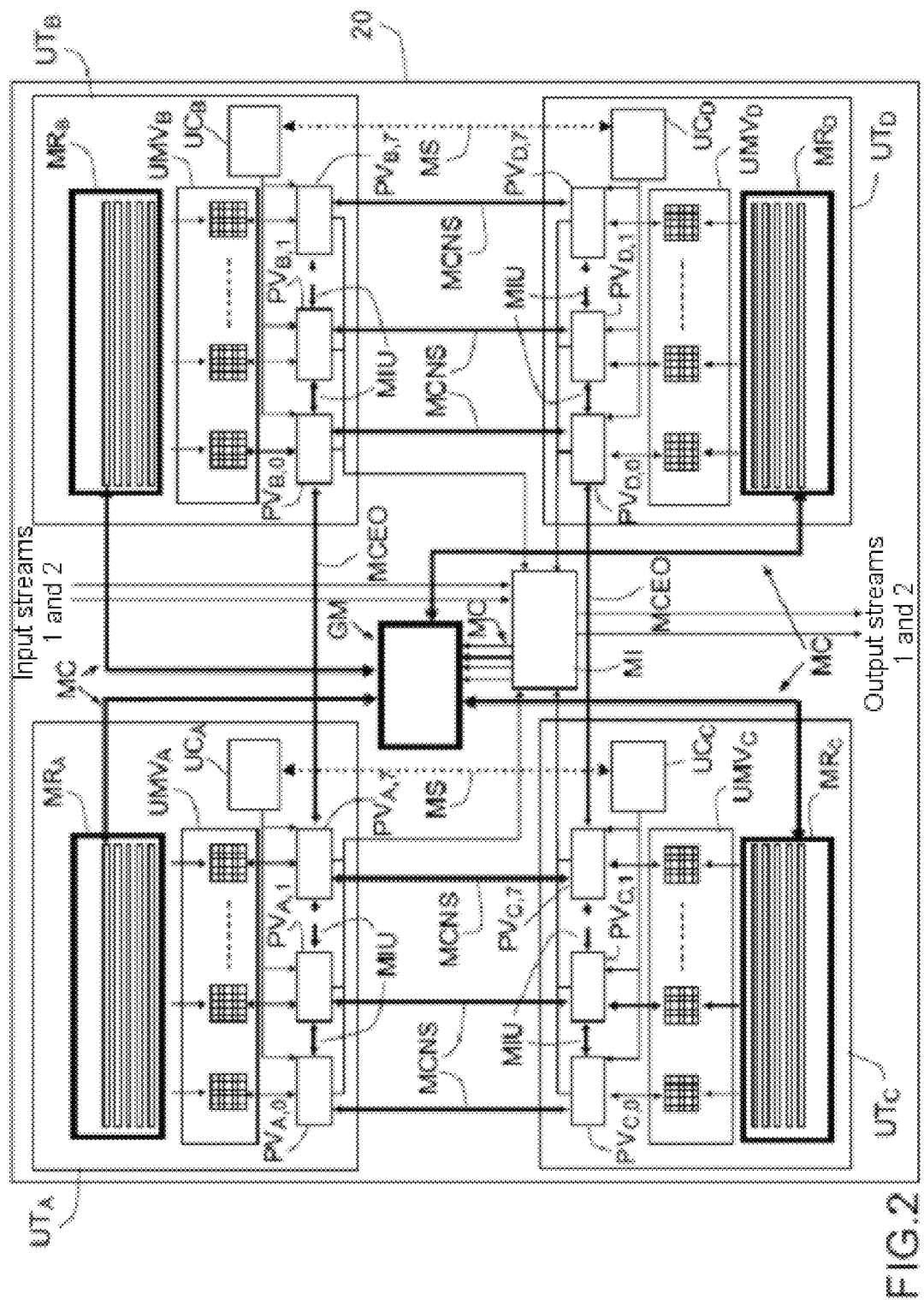
FIG. 2 represents, by a block diagram, an exemplary data stream processing architecture according to the invention.

FIG. 2 represents, by a block diagram, an exemplary data stream processing architecture according to the invention. The architecture 20 comprises four processing units $UT_A$, $UT_B$, $UT_C$ and $UT_D$, generically denoted UT, interconnection means MI and a storage manager GM. The interconnection means MI can receive one or more input data streams and deliver one or more output data streams respectively corresponding to the data streams received and delivered by the architecture 20. In the example of FIG. 2, the architecture 20 is considered to receive two data streams and deliver two of them. The interconnection means MI also make it possible to direct one or more data streams to the storage manager GM. The storage manager GM comprises, for each processing unit $UT_A$, $UT_B$, $UT_C$ and $UT_D$, a reserve memory $MR_A$, $MR_B$, $MR_C$ and $MR_D$, respectively, said memories being generically denoted MR. Each reserve memory makes it possible to store data that can form a neighborhood of pixels of dimension Vl×Nc, called global neighborhood. When the data stream or streams form images of dimension Nl×Nc, a reserve memory MR therefore stores, at each instant, Vl rows of an image. However, since the data arrive in a reserve memory MR in stream form, a global neighborhood does not form a coherent neighborhood at each instant. In other words, even if a reserve memory MR is physically organized in Vl memory rows of Nc columns, the data are not stored in the reserve memory MR in the form of a coherent portion of an image. The data nevertheless make it possible to form a coherent neighborhood. The reserve memories MR can be grouped together within a single physical memory or, as in the example of FIG. 2, distributed within each processing unit UT. The storage manager GM also comprises connection means MC linking the different reserve memories MR together and to the interconnection means MI. They thus make it possible to direct each input data stream to an input of one of the reserve memories MR. They also enable the reserve memories MR to store data so as to form an extended global neighborhood. In the case in point, such a neighborhood of pixels can be formed from an assembly of global neighborhoods. The processing units UT whose reserve memories MR form an extended global neighborhood are said to be coupled. As an example, by considering a coupling of the processing units A and C, the reserve memories $MR_A$ and $MR_C$ can store data that can form an extended global neighborhood of dimension 2·Vl×Nc. More generally, the processing units UT can each be coupled to one or two other processing units UT on a so-called North/South axis and to one or two other processing units on a so-called East/West axis. A coupling on the North/South axis is, for example, a coupling between the processing units $UT_A$ and $UT_C$ or between the processing units $UT_B$ and $UT_D$. A coupling on the East/West axis is, for example, a coupling between the processing units $UT_A$ and $UT_B$ or between the processing units $UT_C$ and $UT_D$. In an architecture comprising K·M processing units UT organized in a matrix of K processing units UT coupled in pairs on the North/South axis and M processing units UT coupled in pairs on the East/West axis, the reserve memories can store data that can form an extended global neighborhood of maximum dimension K·Vl×M·Nc. This neighborhood is also called coupled neighborhood. Each processing unit UT comprises a control unit UC, neighborhood processors PV operating in SIMD mode and a neighborhood storage unit UMV. In the example of FIG. 2, each processing unit $UT_A$ to $UT_D$ comprises eight neighborhood processors, denoted $PV_{A,0}$ to $PV_{A,7}$ for the processing unit $UT_A$, $PV_{B,0}$ to $PV_{B,7}$ for the processing unit $UT_B$, $PV_{C,0}$ to $PV_{C,7}$ for the processing unit $UT_C$, and $PV_{D,0}$ to $PV_{D,7}$ for the processing unit $UT_D$. The neighborhood storage unit UMV enables each neighborhood processor PV to directly access a neighborhood of pixels of dimension Vl×Vc from the data contained in the reserve memory MR associated with the processing unit UT concerned. The neighborhoods of pixels accessible to the processors are coherent neighborhoods, that is to say they correspond to image portions. They are centered on contiguous pixels of one and the same row of the image. Thus, at each instant, an entire block of pixels can be processed simultaneously by the neighborhood processors PV. Two processors PV are said to be neighbors when the neighborhoods of pixels that they can access are centered on contiguous pixels of one and the same row of an image. In the case in point, the neighborhood processors PV of one and the same processing unit UT are neighbors in pairs. A neighborhood storage unit UMV can consist of physical memories storing the different neighborhoods of pixels. It may also consist of means for accessing the reserve memory MR. Each processing unit UT also comprises intra-unit connection means MIU linking its neighboring processors PV in series. In other words, within each processing unit UT, each neighborhood processor PV is linked to its one or more neighboring neighborhood processors PV. In FIG. 2, the neighborhood processor $PV_{A,0}$ is linked to the neighborhood processor $PV_{A,1}$, which is also linked to the neighborhood processor $PV_{A,2}$, and so on to the neighborhood processor $PV_{A,6}$ which is linked to the neighborhood processors $PV_{A,5}$ and $PV_{A,7}$. The intra-unit connection means MIU enable two neighboring processors PV to exchange data with one another. Thus, the neighborhood of pixels accessible to a neighborhood processor PV can be extended to all the neighborhoods of pixels accessible to the neighborhood processors PV of the processing unit UT concerned. When two processing units UT are coupled on the East/West axis, the architecture 20 also comprises connection means on the East/West axis between the neighboring neighborhood processors of these units. These inter-unit connection means, called East/West connection means MCEO, enable these neighborhood processors to exchange data with one another. The neighborhood of pixels accessible to one of the neighborhood processors PV is then extended to the neighborhood of pixels accessible to the neighboring neighborhood processor PV. In FIG. 2, the processing unit $UT_A$ is coupled to the processing unit $UT_B$. The neighborhood processors $PV_{A,7}$ and $PV_{B,0}$ are then linked by East/West connection means MCEO. Similarly, the processing unit $UT_C$ is coupled to the processing unit $UT_D$. The neighborhood processors $PV_{C,7}$ and $PV_{D,0}$ are then linked by East/West connection means MCEO. When two processing units UT are coupled on the North/South axis, the architecture 20 comprises connection means on the North/South axis between the processors of these units. Each neighborhood processor PV of a processing unit UT is linked to one of the neighborhood processors PV of the other processing unit UT, the neighborhood processors being linked in pairs so as to have access to neighborhoods of pixels centered on one and the same column of an image. Two neighborhood processors PV linked in this way are said to be neighbors on the North/South axis. The connection means between neighboring processors, called North/South connection means MCNS, enable each pair of neighboring neighborhood processors on the North/South axis to exchange data with one another. The neighborhood of pixels accessible to one of the neighborhood processors PV is then extended to the neighborhood of pixels accessible to its neighboring neighborhood processor PV. In FIG. 2, the processing unit $UT_A$ is coupled to the processing unit $UT_C$. The neighborhood processors $PV_{A,0}$ to $PV_{A,7}$ are then respectively linked to the neighborhood processors $PV_{C,0}$ to $PV_{C,7}$ by North/South connection means MCNS. Similarly, the processing unit $UT_B$ is coupled to the processing unit $UT_D$. The neighborhood processors $PV_{B,0}$ to $PV_{B,7}$ are then respectively linked to the neighborhood processors $PV_{D,0}$ to $PV_{D,7}$ by North/South connection means MCNS. Obviously, two processing units UT linked on the North/South axis must comprise the same number of neighborhood processors PV. However, it is not necessary for all the processing units UT of an architecture according to the invention to comprise the same number of neighborhood processors PV.

Figure 3:
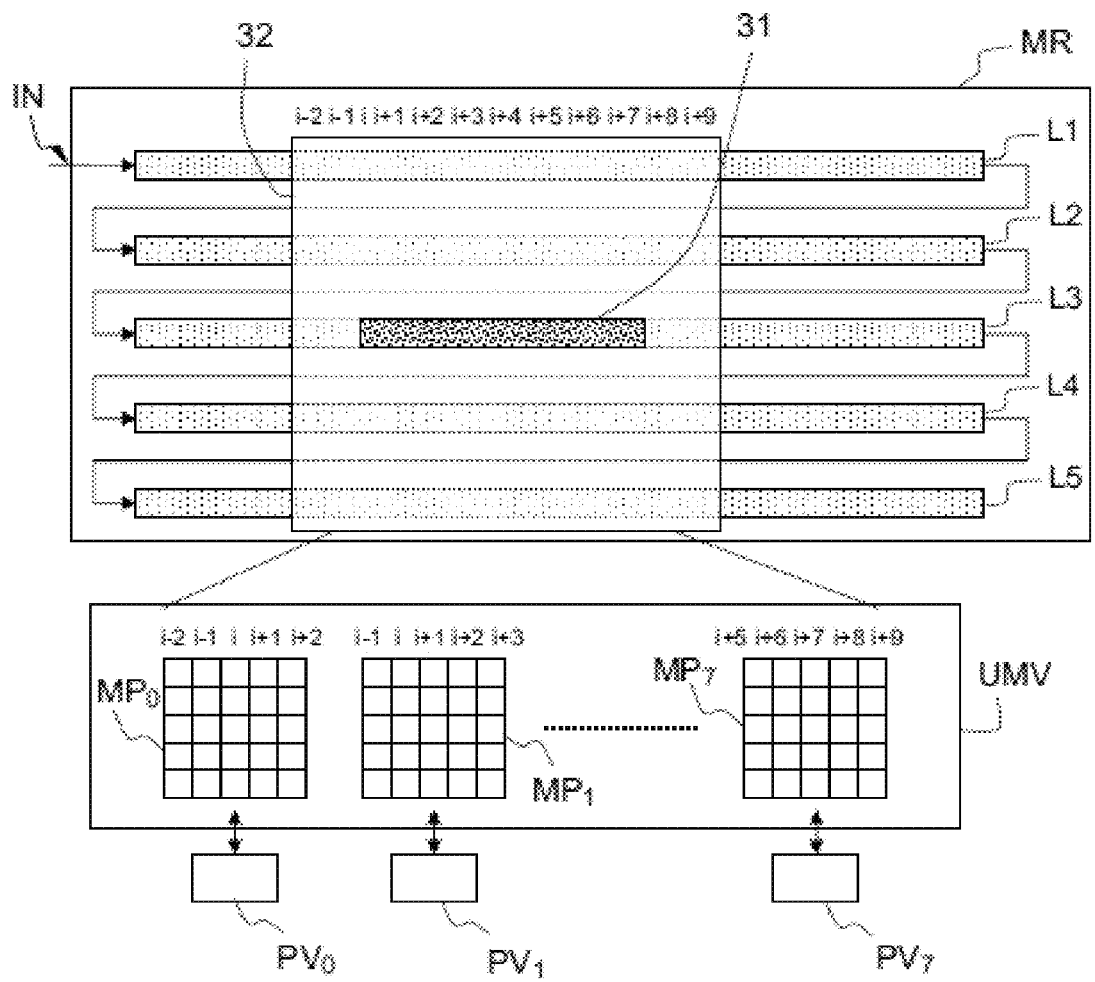
FIG. 3 illustrates the principle of operation of a reserve memory and of a neighborhood storage unit in the architecture of FIG. 2.

FIG. 3 illustrates the principle of operation of a reserve memory MR and of a neighborhood storage unit UMV. The reserve memory MR comprises one input IN and five memory rows L1 to L5 each capable of storing data of a row of an image. The input IN is linked to the first memory row L1 and the memory rows L1 to L5 are linked in series, so that a data stream received on the input IN is successively transmitted to the memory rows L1 to L5. Thus, at each instant, the reserve memory MR contains data that can form a global neighborhood of dimension 5×Nc. Hereinafter in the description of FIG. 3, a given instant is considered for which the data stored in the columns i−2 to i+9 of the reserve memory MR form a coherent neighborhood of pixels, in other words, form a portion of an image. This assumption offers the benefit of simplifying the explanation of the operation of a neighborhood storage unit UMV but does not limit the invention to such a configuration. The neighborhood storage unit UMV enables the processor $PV_0$ to access the pixels of the columns i−2 to i+2 of the reserve memory MR. It enables the processor $PV_1$ to access the pixels of the columns i−1 to i+3, and so on to the processor $PV_7$ which can access the pixels of the columns i+5 to i+9. The neighborhoods of pixels accessible to the neighborhood processors PV are thus centered on the pixels of the third row (L3) and of the columns i to i+7 of the reserve memory MR. These pixels are generally called the processed pixels. They are identified by 31 in FIG. 3. The set of pixels accessible to at least one neighborhood processor PV forms a neighborhood of dimension 5×12, identified by 32 in FIG. 3. When a neighborhood storage unit UMV comprises physical memories MP (denoted $MP_0$ to $MP_7$ in FIG. 3), these can be filled by simple reading from the reserve memory MR at the corresponding columns. The physical memories MP of the storage unit MR globally contain the neighborhood of dimension 5×12. If the data stored in the reserve memory MR do not form a coherent neighborhood, it is nevertheless still possible to fill the physical memories MP of the neighborhood storage unit UMV by reading from the reserve memory MR at the appropriate rows and columns. Similarly, when a neighborhood storage unit UMV does not contain physical memories but access means, the latter can be configured to give the neighborhood processors PV access to the reserve memory MR at the appropriate rows and columns. Obviously, in a data stream processing architecture according to the invention, each reserve memory can contain a different number of memory rows and all the memory rows are not necessarily used. Each memory row can be used partially, and memory rows can be coupled to store larger image rows.

Figure 4:
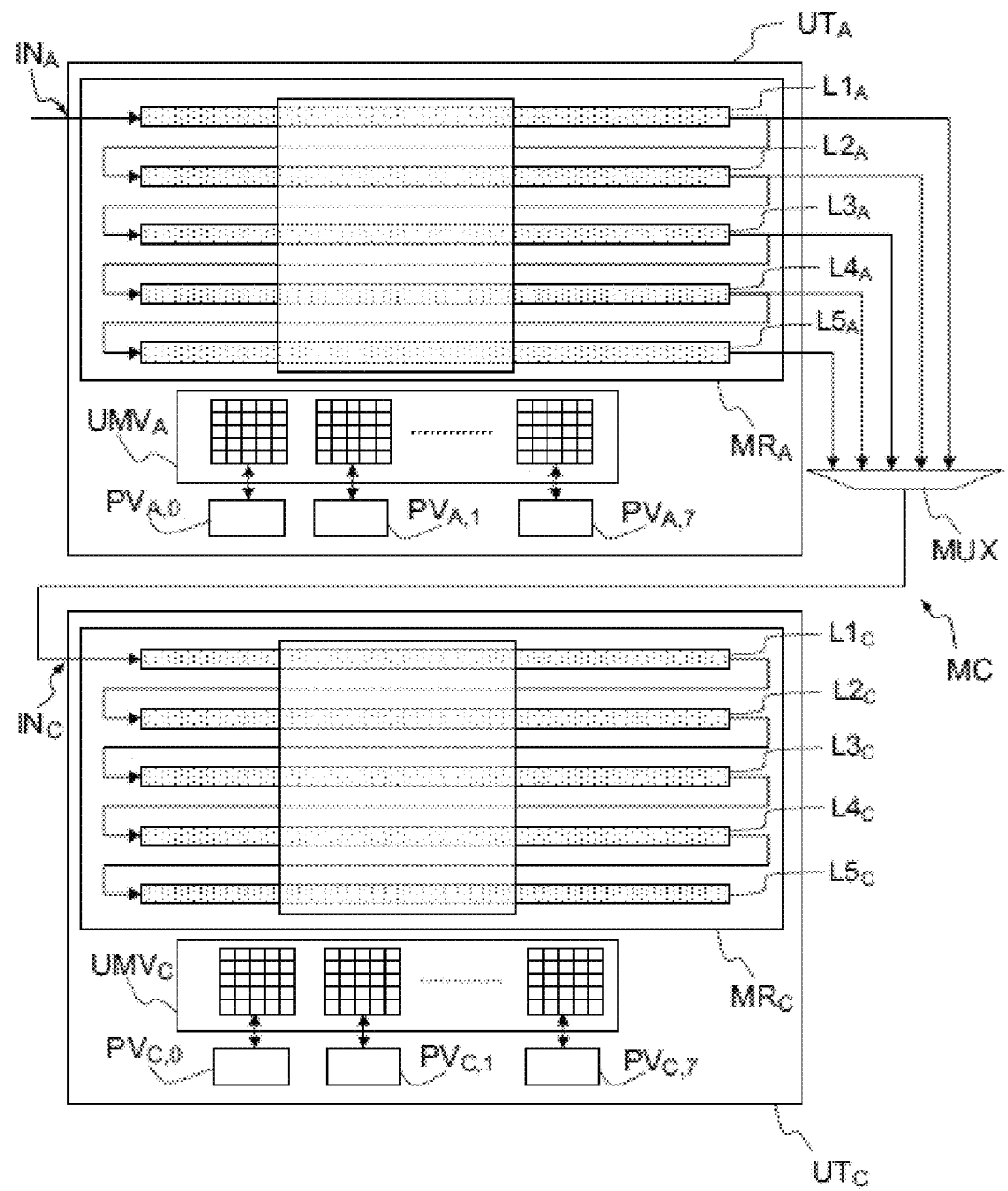
FIG. 4 illustrates the principle of operation of the reserve memories and of the neighborhood storage units of two processing units coupled on a North/South axis.

FIG. 4 illustrates the principle of operation of the reserve memories $MR_A$ and $MR_C$ and of the neighborhood storage units $UMV_A$ and $UMV_C$ of two processing units $UT_A$ and $UT_C$ coupled on the North/South axis. Each reserve memory $MR_A$ or $MR_C$ makes it possible to store data forming a neighborhood of dimension 5×Nc. The connection means MC of the storage manager GM are configured to deliver a data stream to the input $IN_A$ of the reserve memory $MR_A$ and to link an output of one of the memory rows $L1_A$ to $L5_A$ of the reserve memory $MR_A$ to the input $IN_C$ of the reserve memory $MR_C$. The configuration of the connection means MC, notably the selection of the memory row to be linked to the input $IN_C$, is done according to the number of rows of pixels required to form the extended global neighborhood. To select one of the memory rows $L1_A$ to $L5_A$, the connection means MC comprise, for example, a multiplexer MUX comprising five inputs linked to the outputs of the memory rows $L1_A$ to $L5_A$ and an output linked to the input $IN_C$. According to a first configuration, the memory row $L1_A$ is selected to reinject its data into the reserve memory $MR_C$. It is then possible to obtain an extended global neighborhood of dimension 6×Nc, and to use square neighborhood masks of maximum dimension 6×6. In this first configuration, the memory rows $L2_A$ to $L5_A$ are respectively identical to the memory rows $L1_C$ to $L4_C$. The redundant data of these rows can be used either by the neighborhood processors of a single processing unit $UT_A$ or $UT_C$, or by the neighborhood processors of the two processing units $UT_A$ and $UT_C$, for example to perform different processing operations. According to a second configuration, the memory row $L2_A$ is selected. It is then possible to obtain an extended global neighborhood of dimension 7×Nc, and to use neighborhood masks of maximum dimension 7×7. In this second configuration, the memory rows $L3_A$ to $L5_A$ are respectively identical to the memory rows $L1_C$ to $L3_C$. According to a fifth configuration, the memory row $L5_A$ is selected. It is then possible to obtain an extended global neighborhood of dimension 10×Nc, and thus use neighborhood masks of maximum dimension 10×10. In practice, each neighborhood processor $PV_{A,0}$ to $PV_{A,7}$ and $PV_{C,0}$ to $PV_{C,7}$ can access, directly, only the neighborhood of pixels made accessible by the neighborhood storage unit $UMV_A$ or $UMV_C$. In the case in point, each neighborhood processor directly accesses only a neighborhood of pixels of dimension 5×5. However, a neighborhood processor can access all the neighborhoods of pixels accessible to the neighborhood processors $PV_{A,0}$ to $PV_{A,7}$ and $PV_{C,0}$ to $PV_{C,7}$, via the intra-unit connection means MIU and the North/South connection means MCNS. Generally, a neighborhood processor can access all the neighborhoods of pixels accessible to the neighborhood processors of the processing unit to which it belongs, via the intra-unit connection means MIU, as well as all the neighborhoods of pixels accessible to the neighborhood processors of the processing units coupled to the processing unit concerned, via the East/West connection means MCEO and North/South connection means MONO.

According to a particular embodiment, the intra-unit connection means MIU, the East/West connection means MCEO and the North/South connection means MONS comprise, for each neighborhood processor belonging to a coupled processing unit, dedicated registers for each communication direction, North, South, East and West. The dedicated registers may exist only for certain communication directions, according to the couplings required. The neighborhood processors can access these dedicated registers either via a specific address, or by specific instructions. As an example, the specific instructions may take the form "MOVE_V dir reg_dest". For each neighborhood processor executing this instruction, the data located in a dedicated register of its neighboring processor in the direction "dir" are read and written into a register "reg_dest" of the neighborhood processor concerned.

Figure 5:
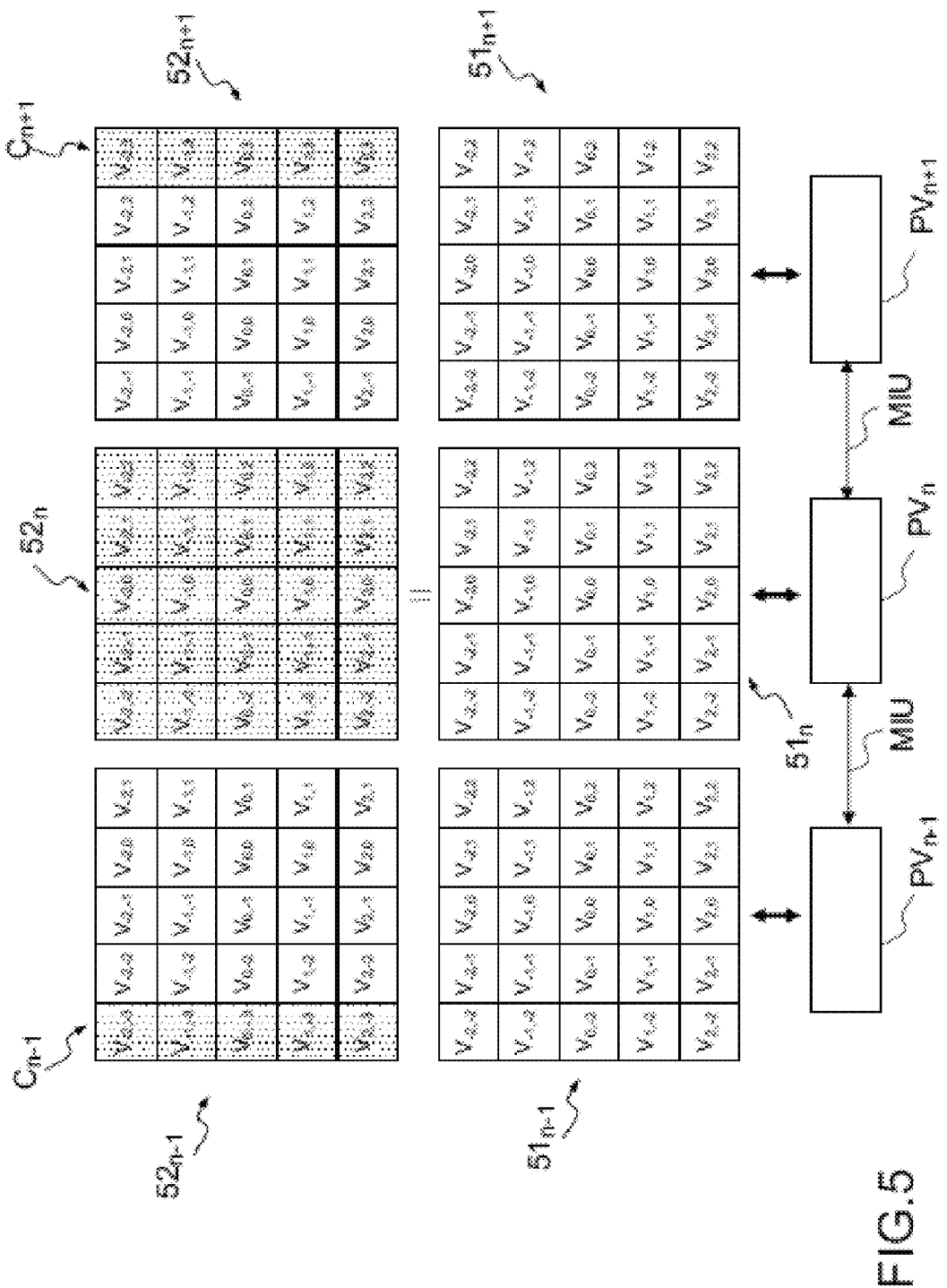
FIG. 5 illustrates the role of intra-unit connection means in the architecture of FIG. 2.

FIG. 5 illustrates the role of the intra-unit connection means MIU for the extension of a neighborhood mask. Three neighborhood processors $PV_{n-1}$, $PV_n$ and $PV_{n+1}$ are considered, linked in series by intra-unit connection means MIU. Each neighborhood processor can directly access a neighborhood of pixels of dimension 5×5. $V_{i,j}$ denotes the address of a pixel seen by a neighborhood processor with i referencing the row and j referencing the column in relation to the central pixel of the neighborhood directly accessible to the neighborhood processor. Thus, $V_{0,0}$ refers to the central pixel or processed pixel of the neighborhood mask. $V_{-2,-2}$ refers to the datum located two rows above and two columns to the left in the neighborhood of pixels. In FIG. 5, the addresses of the pixels accessible to the neighborhood processors $PV_{n-1}$, $PV_n$ and $PV_{n+1}$ are denoted relative to each neighborhood processor $PV_{n-1}$, $PV_n$ and $PV_{n+1}$ in tables $51_{n-1}$, $51_n$ and $51_{n+1}$, respectively, and relative to the neighborhood processor $PV_n$ in tables $52_{n-1}$, $52_n$ and $52_{n+1}$, respectively. The addresses of the pixels are identical in the tables $51_n$ and $52_n$. The neighborhood processors $PV_{n-1}$, $PV_n$ and $PV_{n+1}$ having access to neighborhoods of pixels centered on contiguous pixels of one and the same row of an image, the neighborhood accessible to each neighborhood processor is partly covered by the neighborhood accessible to each neighboring neighborhood processor. For example, the pixel addressed $V_{0,0}$ for the neighborhood processor $PV_n$ corresponds to the pixel addressed $V_{0,1}$ for the neighborhood processor $PV_{n-1}$ and to the pixel addressed $V_{0,-1}$ for the neighborhood processor $PV_{n+1}$. Thus, the intra-unit connection means MIU enable each neighborhood processor to indirectly access additional columns of pixels. In the case in point, the neighborhood processor $PV_n$ can access an additional column in the West direction $C_{n-1}$ by virtue of the neighborhood processor $PV_{n-1}$ and an additional column in the East direction $C_{n+1}$ by virtue of the neighborhood processor $PV_{n+1}$. The number of columns of pixels indirectly accessible is proportional to the number of neighborhood processors within the processing unit.

Figure 6:
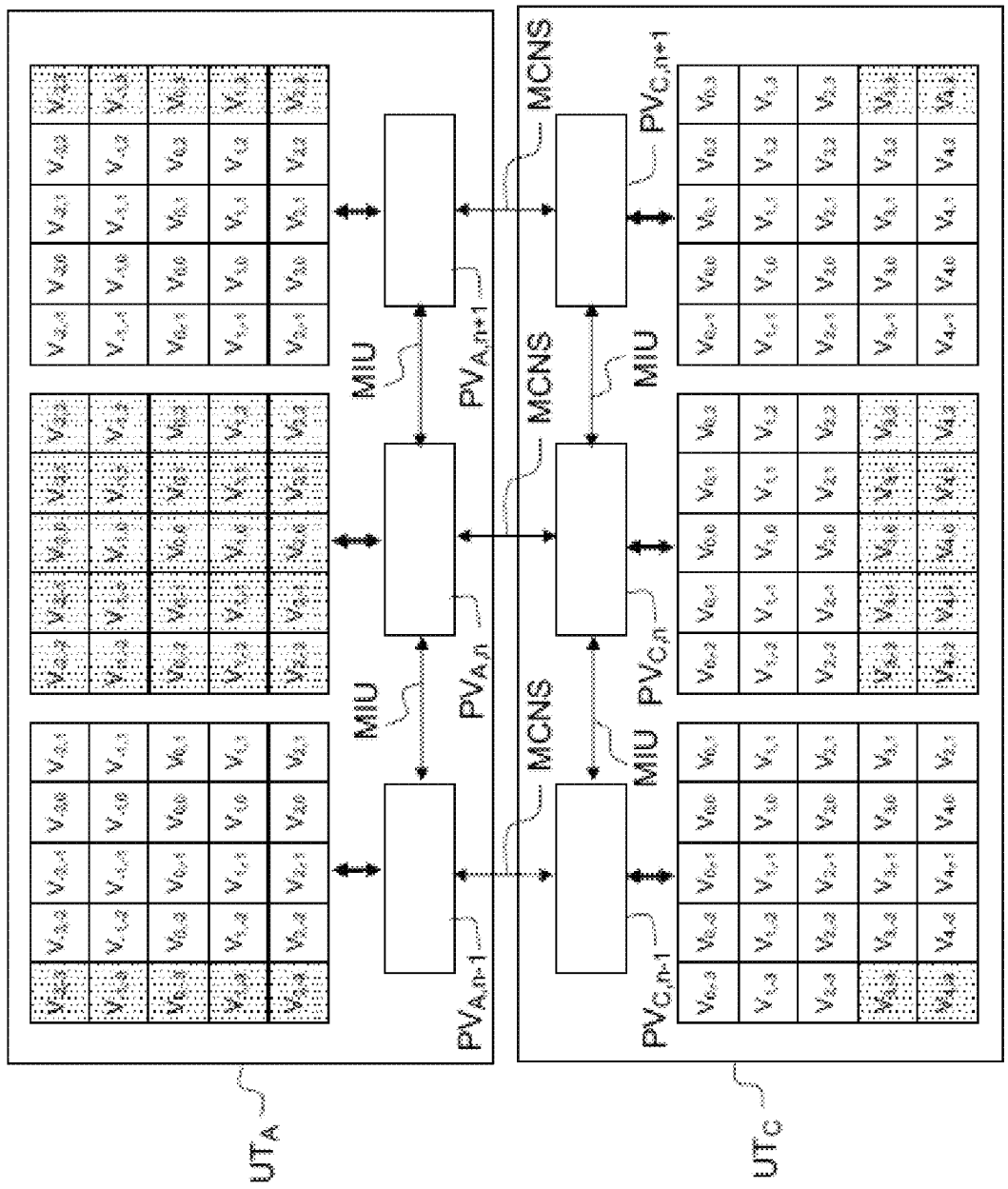
FIG. 6 illustrates the role of the intra-unit connection means and of North/South connection means in the architecture of FIG. 2.

FIG. 6 illustrates the role of the intra-unit connection means MIU and of the North/South connection means MCNS for the extension of a neighborhood mask. The processing units $UT_A$ and $UT_C$, coupled according to the second configuration described with reference to FIG. 4, that is to say for an extended global neighborhood of dimension 7×Nc, are considered. The processing units $UT_A$ and $UT_C$ each comprise three neighborhood processors $PV_{A,n-1}$, $PV_{A,n}$, $PV_{A,n+1}$, $PV_{C,n}$ and $PV_{C,n+1}$, linked in series within each processing unit by intra-unit connection means MIU. FIG. 6 shows only three neighborhood processors for each processing unit. The processing units $UT_A$ and $UT_C$ could nevertheless comprise a larger number thereof. Each neighborhood processor can directly access a neighborhood of pixels of dimension 5×5. The addresses of the pixels accessible to the neighborhood processors are denoted $V_{i,j}$, relative to the neighborhood processor $PV_{A,n}$. North/South connection means MCNS link the processor $PV_{A,n-1}$ to the processor $PV_{C,n-1}$, the processor $PV_{A,n}$ to the processor $PV_{C,n}$ and the processor $PV_{A,n+1}$ to the processor $PV_{C,n+1}$. They enable the processors of the processing unit $UT_A$ to access two additional rows in the South direction, and the processors of the processing unit $UT_C$ to access two additional rows in the North direction. Considering both the intra-unit connection means MIU and the North/South connection means MCNS, each neighborhood processor can thus access a neighborhood of pixels of dimension 7×7. The central pixel of the neighborhood of pixels directly or indirectly accessible to the neighborhood processor $PV_{A,n}$ here corresponds to the pixel addressed $V_{1,0}$.

Hereinafter in the description, the illustrative example is considered of a convolution operation performed on neighborhoods of pixels of dimension 7×7 with the following convolution kernel:

```
1 0 0 1 0 0 1
0 0 0 0 0 0 0
0 0 0 0 0 0 0
1 0 0 1 0 0 1
0 0 0 0 0 0 0
0 0 0 0 0 0 0
1 0 0 1 0 0 1
```

In other words, by considering that the central pixel of a neighborhood on which the convolution operation is performed is denoted $V_{1,0}$, the operation $(V_{-2,-3}+V_{-2,0}+V_{-2,3}+V_{1,-3}+V_{1,0}+V_{1,3}+V_{4,-3}+V_{4,0}+V_{4,3})/9$ must be performed. This operation can be performed for different neighborhoods by the processing units $UT_A$ and $UT_C$ coupled on the North/South axis in accordance with the configuration described with reference to FIG. 6. For each neighborhood processor $PV_{A,n-1}$, $PV_{A,n}$, $PV_{A,n+1}$, $PV_{C,n-1}$, $PV_{A,n}$ and $PV_{C,n+1}$, general registers R1, R2, R3 are considered which make it possible to store data for the neighborhood processor concerned, and dedicated registers RO, RE, RNS are considered that make it possible to store data accessible to its West, East and North/South neighboring neighborhood processors respectively. The neighborhood processors may comprise separate registers for communications in the North and South directions. However, since only two processing units $UT_A$ and $UT_C$ are coupled on the North/South axis in the present example, a single dedicated register for both North and South directions is sufficient. It is also considered that each neighborhood processor can access the dedicated registers of its neighboring processors by the instructions "MOVE_V dir reg_dest" described above. The following lines show an example of code that can be executed by the processing units $UT_A$ and $UT_C$ to perform the convolution operation. The code lines beginning with two hyphens (- -) are comments making it possible to follow the progress of the operation.

UT A

RE = V(-2,-2) + V(1,-2)
-- RE(PVAn) = $V_{-2,-2}$ + $V_{1,-2}$
-- (ie) RE(PVAn-1)= $V_{-2,-3}$ + $V_{1,-3}$
RO = V(-2,2) + V(1,2)
-- RO(PVAn) = $V_{-2,2}$ + $V_{1,2}$
-- RO(PVAn+1)= $V_{-2,3}$ + $V_{1,3}$
MOVE_V West R1
-- R1(PVAn) = RE(PVAn-1) = $V_{-2,-3}$ + $V_{1,-3}$
MOVE_V East R2
-- R2(PVAn) = RO(PVAn+1) = $V_{-2,3}$ + $V_{1,3}$
R3 = R1 + R2
-- R3(PVAn) = $V_{-2,-3}$ + $V_{1,-3}$ + $V_{-2,3}$ + $V_{1,3}$
R3 = R3 + V(-2,0)
-- R3(PVan) = $V_{-2,-3}$ + $V_{1,-3}$ + $V_{-2,3}$ + $V_{1,3}$ + $V_{-2,0}$ -continued R3 = R3 + V(1,0)
-- R3(PVAn) = $V_{-2,-3}$ + $V_{1,-3}$ + $V_{-2,3}$ + $V_{1,3}$ + $V_{-2,0}$ + $V_{1,0}$
MOVE_V South R2
-- R2(PVAn) = RNS(PVCn) = $V_{4,-3}$ + $V_{4,3}$ + $V_{4,0}$
R3 = R3 + R2
-- R3(PVAn) = $V_{-2,-3}$ + $V_{1,-3}$ + $V_{-2,3}$ + $V_{1,3}$ + $V_{-2,0}$ + $V_{1,0}$ + $V_{4,-3}$ + $V_{4,3}$ + $V_{4,0}$
R3 = R3/9
-- R3(PVAn) = ($V_{-2,-3}$ + $V_{1,-3}$ + $V_{-2,3}$ + $V_{1,3}$ + $V_{-2,0}$ + $V_{1,0}$ + $V_{4,-3}$ + $V_{4,3}$ + $V_{4,0}$)/9
UT C RE = V(2,-2)
-- RE(PVCn) = $V_{2,-2}$
-- (ie) RE(PVCn-1)= $V_{4,-3}$
RO = V(2,2)
-- RO(PVCn) = $V_{2,2}$
-- RO(PVCn+1)= $V_{4,3}$
MOVE_V West R1
-- R1(PVCn) = RE(PVCn-1) = $V_{4,-3}$
MOVE_V East R2
-- R2(PVCn) = RO(PVCn+1) = $V_{4,3}$
R3 = R1 + R2
-- R3(PVCn) = $V_{4,-3}$ + $V_{4,3}$
RNS = R3 + V(2,0)
-- RNS(PVCn) = $V_{4,-3}$ + $V_{4,3}$ + $V_{4,0}$ In the above example, it is the neighborhood processors $PV_{A,n-1}$, $PV_{A,n}$ and $PV_{A,n+1}$ which contain the final results of the convolution operations. The output data stream corresponding to the convolution operations is therefore generated by the processing unit $UT_A$. The processing unit $UT_C$ does not generate any output data stream in this example, but is only used by the processing unit $UT_A$ for its computation and storage resources as well as for access to its neighborhoods of pixels. This example shows that the coupling on the North/South axis makes it possible not only to support processing operations requiring extended neighborhood masks, but that it also makes it possible to increase the computation capacity on this neighborhood mask since the computation resources of both processing units are used.

The code presented as an example above illustrates the fact that, in the programming of processing units coupled on the North/South axis, it is necessary to check that the data recovered by the neighborhood processors of a first processing unit indeed have been made available by the neighborhood processors of a second processing unit. In the preceding example, this entails checking that the registers RNS of the neighborhood processors $PV_{C,n-1}$, $PV_{A,n}$ and $PV_{C,n+1}$ do indeed contain the results of the operations $V_{4,-3}+V_{4,3}+V_{4,0}$ in the reading of these registers by the neighborhood processors $PV_{A,n-1}$, $PV_{A,n}$ and $PV_{A,n+1}$. In other words, it entails checking that the last instruction executed by the neighborhood processors of the processing unit $UT_C$ is executed before executing the instruction "MOVE_V South R2". In order to relax this programming constraint, the processing architecture according to the invention may comprise means for synchronizing the processing units coupled on the North/South or East/West axis. In FIG. 2, the synchronization means, denoted MS, are represented in the form of communication means between the control units UC of the processing units coupled on the North/South axis. These synchronization means are, for example, produced through the use of "flags", as is known in the computing field. The synchronization means may comprise a flag for each possible or actual coupling between two processing units UT coupled on the North/South or East/West axis. Physically, the flags may be implemented in the form of one or more status registers, each bit of this or these registers being associated with a coupling on the North/South or East/West axis between two processing units UT. Each bit can be accessed in read mode and in write mode by the control units UC of the coupled processing units. It can take two values, a first, for example "1", to indicate that the data are available, and a second value, for example "0", to indicate that the data are not available. The synchronization of the processing units is managed by a communication of "handshake" type. Thus, when the neighborhood processors of a first processing unit have to recover data stored in the neighborhood processors of a second processing unit coupled to the first in the North, South, East or West direction, the control unit of the first processing unit must interrogate, that is to say read, the setting of the corresponding flag. If the flag indicates that the data are available, then the data can be read, for example by means of the instructions "MOVE_V South" or "MOVE_V North". The flag is then reset to the setting indicating that the data are not available, by writing the corresponding value in the corresponding bit. On the other hand, if the flag indicates that the data are not available, then the neighborhood processors of the first processing unit must wait before reading the data from the second processing unit. They can either be blocked, that is to say not execute any instruction, until the flag is set to the setting indicating that the data are available, or execute other instructions, the control unit of the first processing unit again interrogating the setting of the flag at the end of the execution of these instructions.

The code presented previously is reprised below with synchronization by flag. The flag used in this example is named F1. It indicates that the data present in the registers RNS of the neighborhood processors $PV_{C,n-1}$, $PV_{C,n}$ and $PV_{C,n+1}$ are available. The interrogation as to its setting is performed by a "CHECK_FLAG flag" instruction, in which "flag" designates a flag. The setting of a flag "flag" is performed by a "SET_FLAG flag val" instruction, in which "val" takes the value "0" or "1". In our example, the values "1" and "0" respectively indicate that the data are and are not available.

---

UT A

RE = V(−2,−2) + V(1,−2)
-- RE(PVAn) = $V_{−2,−2} + V_{1,−2}$
-- (ie) RE(PVAn−1) = $V_{−2,−3} + V_{1,−3}$
RO = V(−2,2) + V(1,2)
-- RO(PVAn) = $V_{−2,2} + V_{1,2}$
-- RO(PVAn+1) = $V_{−2,3} + V_{1,3}$
MOVE_V West R1
-- R1(PVAn) = RE(PVAn−1) = $V_{−2,−3} + V_{1,−3}$
MOVE_V East R2
-- R2(PVAn) = RO(PVAn+1) = $V_{−2,3} + V_{1,3}$
R3 = R1 + R2
-- R3(PVAn) = $V_{−2,−3} + V_{1,−3} + V_{−2,3} + V_{1,3}$
R3 = R3 + V(−2,0)
-- R3(PVan) = $V_{−2,−3} + V_{1,−3} + V_{−2,3} + V_{1,3} + V_{−2,0}$
R3 = R3 + V(1, 0)
-- R3(PVAn) = $V_{−2,−3} + V_{1,−3} + V_{−2,3} + V_{1,3} + V_{−2,0} + V_{1,0}$
CHECK_FLAG F1
-- Check that the flag F1 is set to the value "1" before continuing
MOVE_V South R2
-- R2(PVAn) = RNS(PVCn) = $V_{4,−3} + V_{4,3} + V_{4,0}$
SET_FLAG F1 0
-- The flag F1 is reset to the value "0"
R3 = R3 + R2
-- R3(PVAn) = $V_{−2,−3} + V_{1,−3} + V_{−2,3} + V_{1,3} + V_{−2,0} + V_{1,0} + V_{4,−3} + V_{4,3} + V_{4,0}$
R3 = R3/9
-- R3(PVAn) = $(V_{−2,−3} + V_{1,−3} + V_{−2,3} + V_{1,3} + V_{−2,0} + V_{1,0} + V_{4,−3} + V_{4,3} + V_{4,0})/9$

---

UT C

RE = V(2,−2)
-- RE(PVCn) = $V_{2,−2}$
-- (ie) RE(PVCn−1) = $V_{4,−3}$
RO = V(2,2)
-- RO(PVCn) = $V_{2,2}$
-- RO(PVCn+1) = $V_{4,3}$
MOVE_V West R1
-- R1(PVCn) = RE(PVCn−1) = $V_{4,−3}$
MOVE_V East R2
-- R2(PVCn) = RO(PVCn+1) = $V_{4,3}$
R3 = R1 + R2
-- R3(PVCn) = $V_{4,−3} + V_{4,3}$
RNS = R3 + V(2,0)
-- RNS(PVCn) = $V_{4,−3} + V_{4,3} + V_{4,0}$
SET_FLAG F1 1
-- The value is available

---

The above example makes it possible to highlight the fact that the registers RNS of the neighborhood processors $PV_{C,n-1}$, $PV_{C,n}$ and $PV_{C,n+1}$ are read only when the flag F1 indicates that the data in these registers are available.

The invention claimed is:

1. A data stream processing architecture, the data forming matrices of pixels of dimension NI×Nc, the architecture comprising:
a plurality of sets of processors, each set of processors being capable of receiving an input data stream and of delivering an output data stream, and each set of processors comprising:
a control circuit capable of supplying instructions,
a set of neighborhood processors capable of performing the instructions received from the control circuit and of supplying data forming the output data stream of the set of processors, and
a neighborhood memory enabling each neighborhood processor to access data of the input data stream received by the set of processors forming a neighborhood of pixels of dimension VI×Vc, each neighborhood memory comprising, for each neighborhood processor, a local memory for storing dynamically the data forming the neighborhoods of pixels which the neighborhood processor can access, the neighborhoods of pixels accessible to the processors being centered on contiguous pixels of the same row of a matrix, two processors being neighbors when the neighborhoods that they can access are centered on contiguous pixels in the same row of a matrix; and
interconnectors capable of receiving a data stream at an input of the architecture and the output data streams of the set of processors, and capable of delivering a data stream at an output of the architecture, wherein
two set of processors can be coupled on a North/South axis and each comprise:
same number N of neighborhood processors; and
connectors enabling each neighborhood processor, within the set of processors, to exchange data with each of its neighboring processors belonging to the same set of processors, so that the neighborhood of pixels accessible to a neighborhood processor can be extended to all the neighborhoods of pixels accessible to the neighborhood processors of the same set of processors said set forming a neighborhood of pixels of dimension VI×(Vc+N−1); and
the architecture further comprises:
a storage manager capable of receiving a data stream from the interconnectors and enabling the neighborhood processors of a first coupled set of processors to access neighborhoods of pixels contiguous with the neighborhoods of pixels accessible to the neighborhood processors of a second coupled set of processors, so that the neighborhoods of pixels accessible to the neighborhood processors of the two coupled set of processors can form a vicinity of dimension 2·VI× (Vc+N−1); and connectors on the North/South axis enabling each neighborhood processor of the first coupled set of processors to exchange data with one of the neighborhood processors of the second coupled set of processors, the neighborhood processors being linked in pairs so as to have access to each other's local memory and to have access to neighborhoods of pixels centered on one and the same column of a matrix, so that the neighborhood of pixels accessible to each neighborhood processor can be extended to the neighborhoods of pixels accessible to the neighborhood processor to which it is linked.

2. The architecture of claim 1, wherein the storage manager comprises:

a reserve memory for each coupled set of processors on the North/South axis, each reserve memory being capable of storing data from the stream received by a set of processors being able to form a global neighborhood of pixels of dimension VI×Nc, the neighborhood memory of each said coupled set of processors enabling each of its neighborhood processors to access data in the reserve memory associated with the coupled set of processors; and connectors between the reserve memories, so that the reserve memories associated with two coupled set of processors can store data that can form a coupled neighborhood of pixels of maximum dimension 2·VI×Nc.

3. The architecture of claim 2, in which the reserve memories each comprise VI memory rows, each memory row being capable of storing data from a row of a matrix, the memory rows being linked in series, so that a data stream stored on a first memory row can be transmitted successively to the other memory rows.

4. The architecture of claim 3, wherein the connectors between two reserve memories comprise a multiplexer with VI inputs and one output, each input being able to be linked to one of the memory rows of a first reserve memory, the output being able to be linked to an input of the second reserve memory.

5. The architecture of claim 1, wherein two sets of processors can be coupled on an East/West axis; and the architecture further comprises connectors on the East/West axis enabling a neighborhood processor of a first set of processors coupled on the East/West axis to exchange data with a neighboring neighborhood processor of a second set of processors coupled on the East/West axis to the first set of processors, so that the neighborhood of pixels accessible to each of said neighborhood processors is formed by the joining of the neighborhoods of pixels accessible to each of the two neighborhood processors.

6. The architecture of claim 5, in which the storage manager comprises:

a reserve memory for each set of processors coupled on the East/West axis, each reserve memory being capable of storing data from the stream received by the set of processors being able to form a global neighborhood of pixels of dimension VI×Nc, the neighborhood memory of each coupled set of processors enabling each of its neighborhood processors to access data from the reserve memory associated with the coupled set of processors; and connectors between the reserve memories, so that the reserve memories associated with two sets of processors coupled on the East/West axis can store data that can form a coupled neighborhood of pixels of maximum dimension VI×2·Nc.

7. The architecture of claim 1, further comprising means for synchronizing the coupled set of processors to check that the data that have to be recovered by the neighborhood processors of a first set of processors have been made available by the neighborhood processors of a second set of processors coupled with the first set of processors.

8. The architecture of claim 7, wherein the synchronization means of the coupled set of processors comprise a flag for each coupling between two set of processors, each flag being able to indicate either that the data that have to be recovered by the neighborhood processors of a first set of processors have been made available by the neighborhood processors of a second set of processors coupled with the first set of processors, or that said data are not available.

9. The architecture of claim 1, wherein the connectors on the North/South axis comprise, for each neighborhood processor of a processing unit coupled on the North/South axis, a data register accessible to the neighborhood processor to which it is linked.

10. The architecture of claim 1, wherein the connectors and, where appropriate, the connectors on the East/West axis, comprise, for each neighborhood processor, a first data register accessible to one of its neighboring neighborhood processors, and a second data register accessible to its other neighboring neighborhood processor.

11. The architecture of claim 1, comprising K·M set of processors organized in a matrix of K set of processors coupled in pairs on the North/South axis and M set of processors coupled in pairs on the East/West axis, the storage manager being configured so that the reserve memories can store data that can form a coupled neighborhood of dimension K·VI×M·Nc, and the connectors being configured so that the neighborhood of pixels accessible to each neighborhood processor of a coupled set of processors can be extended to the neighborhoods of pixels accessible to the neighborhood processors of the coupled set of processors.

* * * * *

UNITED STATES PATENT AND TRADEMARK OFFICE
CERTIFICATE OF CORRECTION

PATENT NO. : 9,129,345 B2  
APPLICATION NO. : 13/637366  
DATED : September 8, 2015  
INVENTOR(S) : Maria Lecellier et al.

Page 1 of 1

It is certified that error appears in the above-identified patent and that said Letters Patent is hereby corrected as shown below:

Title Page

In the Assignee information:

Please replace "Commissariat A L'Engergie Atomique et aux Energies Alternatives" with --Commissariat A L'Energie Atomique et aux Energies Alternatives--.

Signed and Sealed this  
Eighth Day of March, 2016

Michelle K. Lee  
*Director of the United States Patent and Trademark Office*